US009143776B2

(12) United States Patent
Zhang et al.

(10) Patent No.: US 9,143,776 B2
(45) Date of Patent: Sep. 22, 2015

(54) NO-REFERENCE VIDEO/IMAGE QUALITY MEASUREMENT WITH COMPRESSED DOMAIN FEATURES

(75) Inventors: Yifu Zhang, College Station, TX (US); Dong-Qing Zhang, Plainsboro, NJ (US); Hong Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 559 days.

(21) Appl. No.: 13/465,806

(22) Filed: May 7, 2012

(65) Prior Publication Data

US 2013/0293725 A1 Nov. 7, 2013

(51) Int. Cl.
*H04N 7/12* (2006.01)
*H04N 17/02* (2006.01)

(52) U.S. Cl.
CPC .................................... *H04N 17/02* (2013.01)

(58) Field of Classification Search
CPC ....................................................... H04N 17/02
USPC ..................................... 375/240.03; 370/252
See application file for complete search history.

(56) References Cited

U.S. PATENT DOCUMENTS

| 6,011,868 A * | 1/2000 | van den Branden et al. . 382/233 |
| 2007/0268836 A1* | 11/2007 | Byun et al. ..................... 370/252 |
| 2008/0284853 A1* | 11/2008 | Juric et al. ..................... 348/192 |
| 2009/0208140 A1* | 8/2009 | Jayant et al. .................. 382/309 |

OTHER PUBLICATIONS

Ries, M.; Nemethova, O.; Rupp, M., "Motion Based Reference-Free Quality Estimation for H.264/AVC Video Streaming," Wireless Pervasive Computing, 2007. ISWPC '07. 2nd International Symposium on , Feb. 5-7, 2007.*
Ries, M.; Crespi, C.; Nemethova, O.; Rupp, M., "Content Based Video Quality Estimation for H.264/AVC Video Streaming," Wireless Communications and Networking Conference, 2007.WCNC 2007. IEEE , Mar. 11-15, 2007.*
Chou, Chun-Hsien., et al., "A Perceptually Tuned Subband Image Coder Based on the Measure of Just-Noticeable-Distortion Profile," IEEE Transactions on Circuits and Systems for Video Technology, vol. 5, No. 6, Dec. 1995, pp. 467-476.
International Telecommunication Union, "Series G: Transmission Systems and Media, Digital Systems and Networks, Quality of Service and Performance—Generic and User-Related Aspects, Opinion Model for Video-Telephony Applications," ITU-T Telecommunication Standardization Sector of ITU, G.1070, Apr. 2007, 28 pages.

(Continued)

*Primary Examiner* — Allen Wong
(74) *Attorney, Agent, or Firm* — Slater & Matsil, L.L.P.

(57) ABSTRACT

Techniques for objectively determining perceived video/image quality, the techniques including receiving a degraded bit-stream comprising encoded video/image data, and subsequently parsing the bit-stream to extract one or more video/image coding components. The video coding components may include intra-prediction modes, discrete cosine transform (DCT) coefficients, motion information, or combinations thereof, and may be used as a basis for objectively predicting a Quality of Experience (QoE) or Motion Opinion Score (MOS) score of the degraded bit-stream.

19 Claims, 4 Drawing Sheets

(56) References Cited

OTHER PUBLICATIONS

Wang, Beibei, et al., "Efficient Frame Complexity Estimation and Application to G.1070 Video Quality Monitoring," 2011 Third International Workshop on Quality of Multimedia Experience (QoMEX), Sep. 7-9, 2011, pp. 96-101.

Wang, Zhou., et al., "Video Quality Assessment Using a Stastical Model of Human Visual Speed Perception," Journal of the Optical Society of America A, vol. 24, Issue 12, 2007, pp. B61-B69.

* cited by examiner

NO-REFERENCE VIDEO/IMAGE QUALITY MEASUREMENT WITH COMPRESSED DOMAIN FEATURES

TECHNICAL FIELD

The present invention generally relates to no-reference video/image quality measurement, and, more specifically, to objective techniques for estimating a Quality of Experience (QoE) score or Motion Opinion Score (MOS) based on compressed domain features.

BACKGROUND

When providing video or image services, service providers may want to monitor the subjective quality of their users' experience, which may be commonly referred to as the Quality of Experience (QoE) score or Motion Opinion Score (MOS). Due to the complex nature of the human visual system (HVS), QoE scores may be affected by both the content of the video media as well as the quality of video signal. Specifically, human perception may be more sensitive to qualitative differences for certain classes of content than other classes of content. For instance, distortion may be more noticeable during periods of light motion than during periods of heavy motion (e.g., action scenes). Additionally, the HVS may be more sensitive to some luma (or brightness) levels, and consequently the average luma level of a frame or sequence of frames may impact the QoE score. As a result, monitoring traditional Quality of Service (QoS) metrics (e.g., bit error rate, etc.) alone may be an unreliable means for gauging QoE.

One technique for accurately gauging QoE scores is to obtain subjective assessments of image quality based on real-time human response, a procedure for which is outlined in the International Telecommunications Union (ITU) Radiocommunication Sector (ITU-R) recommendation BT.500 entitled "Methodology for Subjective Assessment of Quality of Television Pictures." Although accurate, subjective testing of this nature may require strict 'laboratory type' settings, and therefore may be expensive, time-consuming, and altogether impractical. As such, an objective approach for accurately gauging QoE is desired.

SUMMARY OF THE INVENTION

These and other problems are generally solved or circumvented, and technical advantages are generally achieved, by preferred embodiments of the present invention which describe an apparatus and method for no-reference video quality measurement with compressed domain features.

In accordance with an embodiment, a method is provided for objectively determining perceived video/image quality. In this example, the method includes receiving a bit-stream comprising encoded video/image data corresponding to an original frame or an original sequence of frames, and parsing the bit-stream to extract one or more video/image coding components. The extracted video/image coding components may include at least one of a set of intra-prediction modes, a set of discrete cosine transform (DCT) coefficients, and a motion information. Finally, the method may perform a prediction function based at least in part on the extracted one or more video/image coding components to estimate a QoE score for the encoded video/image data.

In accordance with another embodiment, a method for objectively determining perceived image quality. In this example, the method comprises receiving a bit-stream comprising encoded video/image data corresponding to an original frame or an original sequence of frames, and parsing the bit-stream to extract one or more video/image coding components. The extracted one or more video/image coding components comprise at least one of a set of intra-prediction modes, a set of DCT coefficients, and a motion information. The method may further comprise determining a content classification corresponding to the original frame or the original sequence of frames based on the extracted one or more video/image coding components. The method may further comprise performing a prediction function to estimate a QoE score for the encoded video/image data, where the training data has a similar content classification to that of the original frame or the original sequence of frames.

In accordance with yet another embodiment, a computer program produce for objectively determining perceived image quality. The computer program produce may include code for receiving a degraded bit-stream comprising a plurality of video/image coding components corresponding to a plurality of macroblocks or blocks of an original sequence of frames. The computer program may further comprise code for parsing the degraded bit-stream to extract one or more of the video/image coding components, and thereafter estimating an average luma value for at least one of the macroblocks or blocks based on the extracted video/image coding components. Lastly, the computer program may include code for estimating a QoE score corresponding to the degraded video/image bit-stream based at least in part on the complexity of the original frame or the original sequence of frames.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An alternative for gauging QoE score may be to do so objectively based on compressed domain features obtained from the degraded bit-stream, which may be performed in a manner consistent with the techniques discussed herein. Specifically, a degraded bit-stream may be parsed to retrieve compressed domain features that include one or more of a set of intra-prediction modes, a set of DCT coefficients, and a motion information. These domain features may be analyzed using a prediction function to determine what impact they have on a QoE or MOS score. The QoE or MOS score may be communicated to the service provider and/or network administrator, who may rely on said information when making service/network related decisions, e.g., channel characteristics may be changed to improve the user's viewing experience. These and other aspects are better understood in light of the disclosures below.

Video media typically involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g. 0, 1, . . . or 256) that represents an image quality or characteristic, such as luminance or chrominance, at the corresponding reference point. A single frame or image may constitute thousands of pixels, and consequently the amount of raw video data needed to depict even a relatively short film or movie can be substantial. As such, raw video data may be compressed prior to being transported across a network, thereby reducing the amount of data needed to represent the video media. Techniques for achieving video compression may be set-forth in video coding standards, such as those defined by International Telecommunications Union (ITU) Telecommunications Standardization Sector (ITU-T) H.264/ Audio visual commission (AVC) and the International Organization for Standardization (ISO)/International Electrotechnical Commission (IEC) Moving Picture Experts Group (MPEG) two (MPEG-II), both of which are incorporated by reference herein as if reproduced in their entireties. As used herein, the terms 'video' and 'image' may be used interchangeably, in that video media typically comprises a series of still images or frames. In other words, techniques described herein for estimating the QoE score of video media (or encoded video stream) may also be applicable to estimating the QoE score of an encoded image (e.g., a single frame).

To compress raw video data, video encoders may rely on various intra-prediction and/or inter-prediction techniques. Intra-prediction techniques may exploit spatial redundancies in a single frame, i.e., the tendency for groups of pixels (macroblocks) within a frame to be substantially correlated with other macroblocks within that same frame. As used herein, the term 'macroblock' may be used interchangeably with the term 'block', as MPEG-2 and/or H.264 video codecs may perform DCT transformations on macroblocks of fixed size (e.g., 16×16 pixels, etc.), which may commonly be referred to as blocks. In other words, the concepts discussed herein are applicable to video coding techniques that use fixed-sized blocks and/or variable-sized sized macroblocks.

Conversely, inter-prediction techniques may exploit temporal redundancies between frames, i.e., the tendency for successive frames (or macroblocks (MBs) within those frames) to be substantially correlated with one another. Intra-predication and inter-prediction techniques may be independently performed by both the encoder and decoder such that significant portions of the video data may be interpolated on the decoder side.

Figure 1:
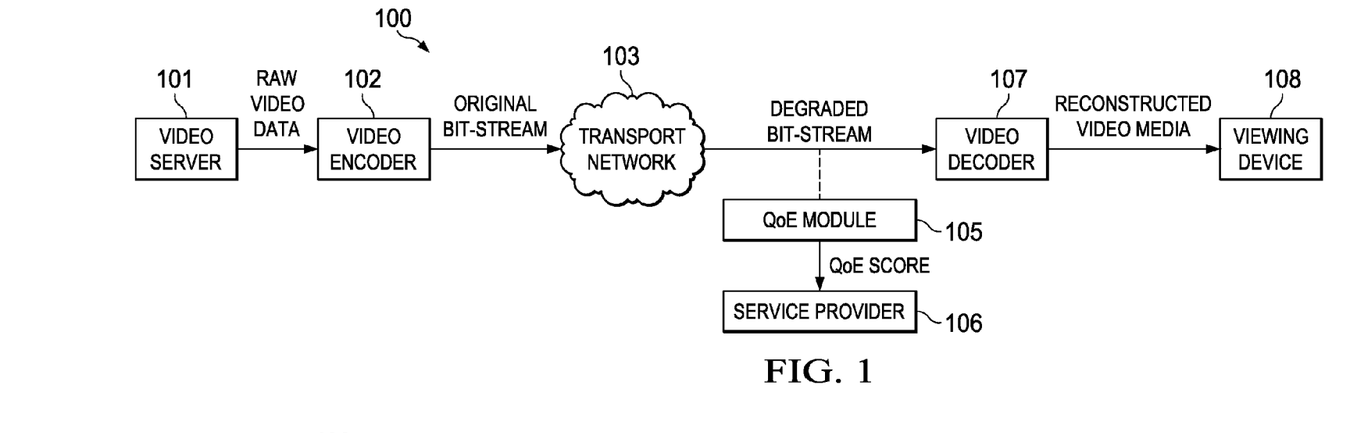
FIG. 1 illustrates a diagram of an embodiment of a network for transporting video media services.

FIG. 1 illustrates a network 100 for transporting video/ image services to a user. The network 100 may comprise a video server 101, a video encoder 102, a transport network 103, a QoE module 105, a service provider 106, a video decoder 107, and a viewing device 108. The video server 101 may be any component or device capable of storing video media and/or providing raw video data. The video encoder 102 may be any component or device capable of compressing raw video data into a bit-stream. The transport network 103 may be any collection of infrastructure components (e.g., switches, linkage, etc.) that allow the bit-stream to be transported to the video decoder 106. The QoE module 105 may be any component configured to objectively determine a QoE score of the video service. The service provider 106 may be any component that allows a network administrator to monitor the QoE score, such as a remote interface or monitoring station. The video decoder 107 may be any component configured to de-compress and/or decode a bit-stream to reconstruct the video media. The viewing device 108 may be any device or component that allows a user to access video media, such as a television, computer, mobile device, etc.

The video server 101 may be configured to send the video media to the video encoder 102 in the form of raw video data. The video encoder 102 may be configured to encode the raw video data to produce an original bit-stream, which may be forwarded to the video decoder 107 via the transport network 103. The original bit-stream may include various video components, including encoder bit-rates, DCT coefficients, quantization parameter (QP) values, intra-prediction modes, motion information, or combinations thereof. Upon reception, the video decoder 107 may decode the bit-stream, thereby reconstructing the video media. The video decoder 107 may then forward the reconstructed video media to the viewing device 108 so that the user may access the video media.

The reconstructed video media may be an imperfect replica of the original video media due to distortion in the transport network 103, as well as due to the lossy nature of video compression. The QoE module 105 may estimate the QoE of the replicated video media by monitoring QoS levels, as well as by analyzing one or more video coding components contained within the degraded bit-stream. The QoE module 105 may then communicate the estimated QoE score to the service provider 106, who may adjust network settings (e.g., add channel bandwidth) accordingly to maintain an adequate QoE.

Figure 2:
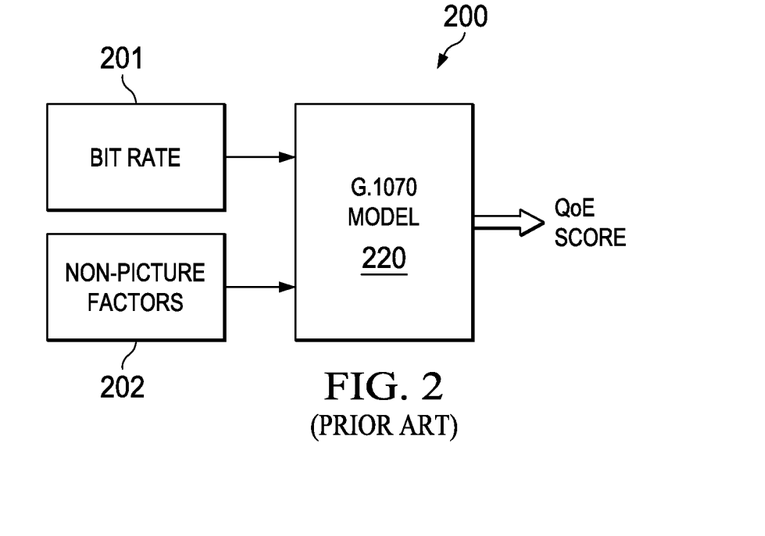
FIG. 2 illustrates a block diagram of a prior art QoE module for objectively estimating a QoE score.
Figure 3:
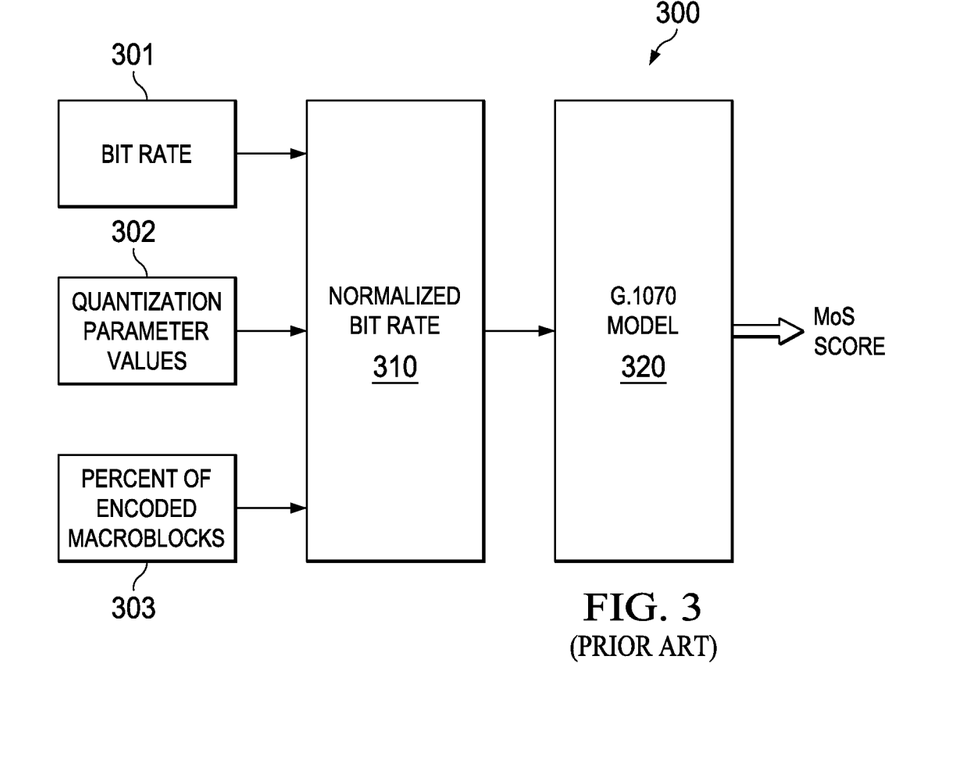
FIG. 3 illustrates a block diagram of another prior art QoE module for objectively estimating a QoE score.

FIG. 2 illustrates a prior art QoE module 200 for objectively estimating a QoE score of a degraded video data stream. The QoE module 200 may rely on a first input 201 corresponding to the bit-rate of the encoder, as well as a second input 202 corresponding to one or more non-picture related factors (e.g., frame-rate, packet loss, etc.). FIG. 3 illustrates another prior art QoE module 300 for objectively estimating a QoE score of a degraded video data stream. The QoE module 300 may rely on the normalized bit rate 310, which may be determined based on one or more of a first input 301 corresponding to the bit-rate of the encoder, a second input 302 corresponding to QP values 302, and a third input 303 corresponding to the percent of encoded MBs (e.g., how many MBs are encoded, rather than predicted). The QoE modules 200 and 300 are explained in greater detail in ITU-T recommendation G.1070 entitled "Opinion Model for Video-Telephony Applications," which is incorporated herein by reference as if reproduced in its entirety. The accuracy of the QoE modules 200 and 300 may be limited because they consider only a few of the available video coding components. Specifically, the degree to which poor QoS (e.g., high bit-error rates, etc.) translates into a perceived QoE difference may depend heavily on the content of the video media (e.g., heavy/light motion, average luma values, etc.).

The content of video media may be projected, or estimated, based on one or more video coding components (e.g., compressed domain features). The term 'video coding components' may refer to any information that is included in the bit-stream as the result of encoding. Video coding components may include encoder bit-rate, QP values, intra-prediction modes, DCT coefficients, motion information, and other information that may be used (separately or collectively) to classify the content of the video media stream.

Encoder bit-rate may be one video coding component that corresponds to the instantaneous or normalized rate at which video data is encoded into the bit-stream by the encoder. Encoder bit-rate may be variable to allow higher bit-rates (more storage space) to be allocated for more complex segments of video media and lower bit-rates (less storage space) to be allocated for less complex segments of video media. This may allow the encoder to use more processing/bandwidth resources to depict complex scenes, while allowing simple scenes to be depicted using substantially less processing/bandwidth resources. Hence, high encoder bit-rates may suggest that the video media's content is relatively complex, while low encoder bit-rates may suggest that the video media's content is relatively simple.

Other video coding components (e.g., QP values, intra-prediction modes, DCT coefficients, motion information, etc.) may be a by-product of intra-prediction and/or inter-prediction. As such, a brief overview of exemplary encoding techniques using intra-prediction and inter-prediction are included below. It should be noted that these exemplary techniques are included herein for the purpose of giving context to the various video coding components, and should not be interpreted to limit this disclosure in any manner. Encoding may begin with intra-prediction, where the encoder may divide a single frame into a plurality of MBs, and then use some MBs (e.g., reference MBs positioned in and extending from the upper-left hand corner of the frame) to predict the pixel values of other MBs (e.g., predicted MBs) based on one of a plurality of intra-prediction modes (e.g., common patterns/textures). The predicted MB may be a rough estimation of a real MB in the frame, and the intra-prediction mode may be a predefined pattern that is used to roughly predict the real MB based on the surrounding reference MBs. The encoder may also generate a residual MB by subtracting the predicted MB from the real MB. The residual MB may be a two dimensional (2D) array of residual pixel values representing the difference between the predicted MB and the real MB. Notably, the predicted MB may be interpolated by the decoder, and hence may not be included in the bit-stream.

The encoder may then transform, quantize, and encode the residual MBs to form a portion of the bit-stream. Specifically, the residual MB may be transformed into the frequency domain using a DCT algorithm, thereby producing a 2D array of DCT coefficients. Each DCT coefficient may represent a different image frequency component, with the lower frequency image components being more noticeable to human visual perception than the higher frequency image components. After transformation, the DCT coefficients may be quantized to attenuate some or all of the high frequency visual components. The degree to which the DCT coefficients are quantized may be based on a QP value, with higher QP values indicating more compression (i.e., attenuation of more high frequency image components) and lower QP values indicating less compression (i.e., attenuation of fewer high frequency image components). Quantization may attenuate less important DCT coefficients to zero (or a value that is ultimately rounded to zero), because strings of consecutive zeros may enable entropy coding efficiencies. After quantization, the 2D array of quantized DCT coefficients may be scanned into a one dimensional (1D) string of DCT coefficients, which may be entropy encoded to produce a portion of the original bit-stream. In addition to the DCT coefficients, the original bit-stream may include the various intra-prediction modes and QP values used during intra-prediction coding. These values may be used by the decoder to reconstruct the intra-coded frame.

Once a single frame has been intra-coded, that frame may then be used to predict neighboring frames using inter-prediction techniques. During inter-prediction, the encoder may divide a sequence of frames, e.g. 1, 2, 3 ... (N−1), N, into one or more group of pictures (GOPs), e.g. [1-7], [8-14], ... [(N−7)−N] (N is an integer), and then de-correlate frames within the GOP with respect to one another. Each GOP may comprise at least one intra-coded frame (I-frame) and a plurality of predicted frames (P-Frames). I-frames may be reconstructed without reference to neighboring frames (e.g. relying solely on intra-coding techniques), while P-frames may be reconstructed based on the pixel values of one or more reference frames (e.g., neighboring I-frames or P-frames) as well as other motion information. The motion information may include a motion vector specifying the magnitude and direction that a given MB has shifted from the reference frame to the predicted frame. In some instances, the motion vector itself may be predicted (e.g., based on motion vectors of surrounding MBs in the same frame as well as motion vectors of other frames of the GOPs), thereby allowing for even further compression. In such instances, the motion vector may comprise a motion vector prediction component and a motion vector difference component. The motion vector difference component may correspond to the difference between the real motion vector and the predicted motion vector.

Figure 4:
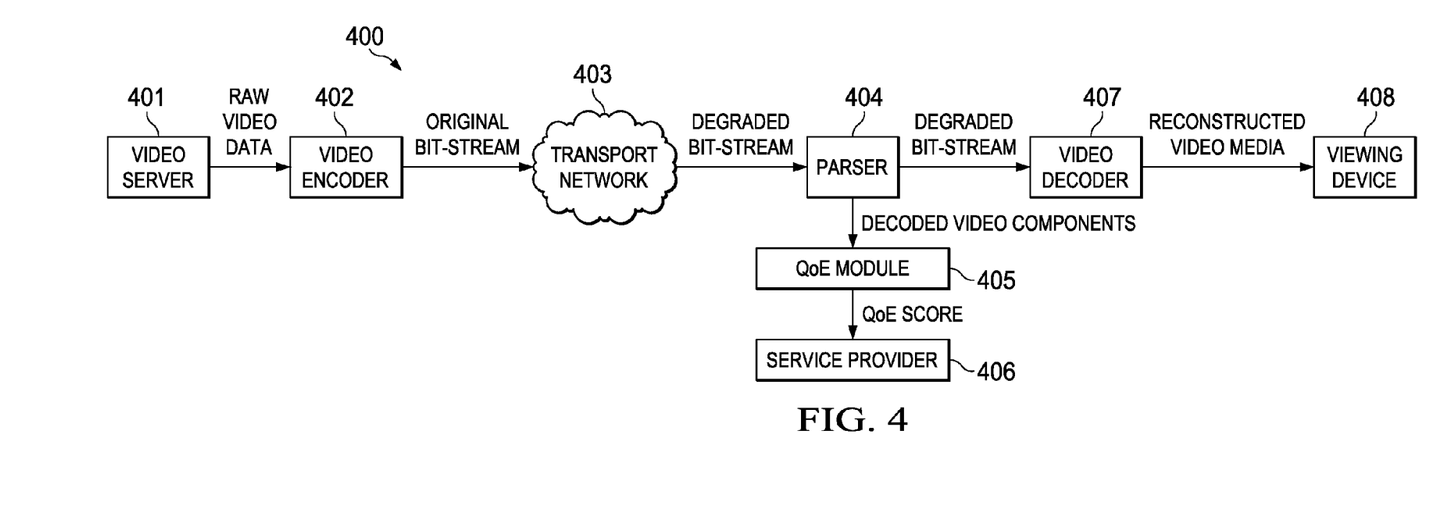
FIG. 4 illustrates a diagram of another embodiment of a network for transporting video media services.

FIG. 4 illustrates an embodiment of a network 400 for transporting video media to a user, while accurately gauging the QoE score. The network 400 may comprise a video server 401, a video encoder 402, a transport network 403, a parser 404, a QoE module 405, a service provider 406, a video decoder 407, and a viewing device 408. The video server 401, the video encoder 402, the transport network 403, the service provider 406, the video decoder 407, and the viewing device 408 may be configured similarly to the corresponding components of the network 100. The parser 404 may be any component configured to analyze the degraded bit-stream to determine (or decode) one or more video components relating to the video media, such as quantization parameter values, intra-prediction modes, DCT coefficients, and/or motion information. These video components may be used to characterize the content of the video media (e.g., heavy motion, luma values, etc.), and therefore may be used by the QoE module when objectively determining QoE. The QoE module 405 may be somewhat similar to the QoE module 105, except that QoE module 405 may compute the QoE score based (at least in part) on the video components provided by the parser 404. Specifically, the QoE module 405 may achieve a more accurate QoE estimation by analyzing the decoded components to determine and/or classify the content of the video media.

Figure 5:
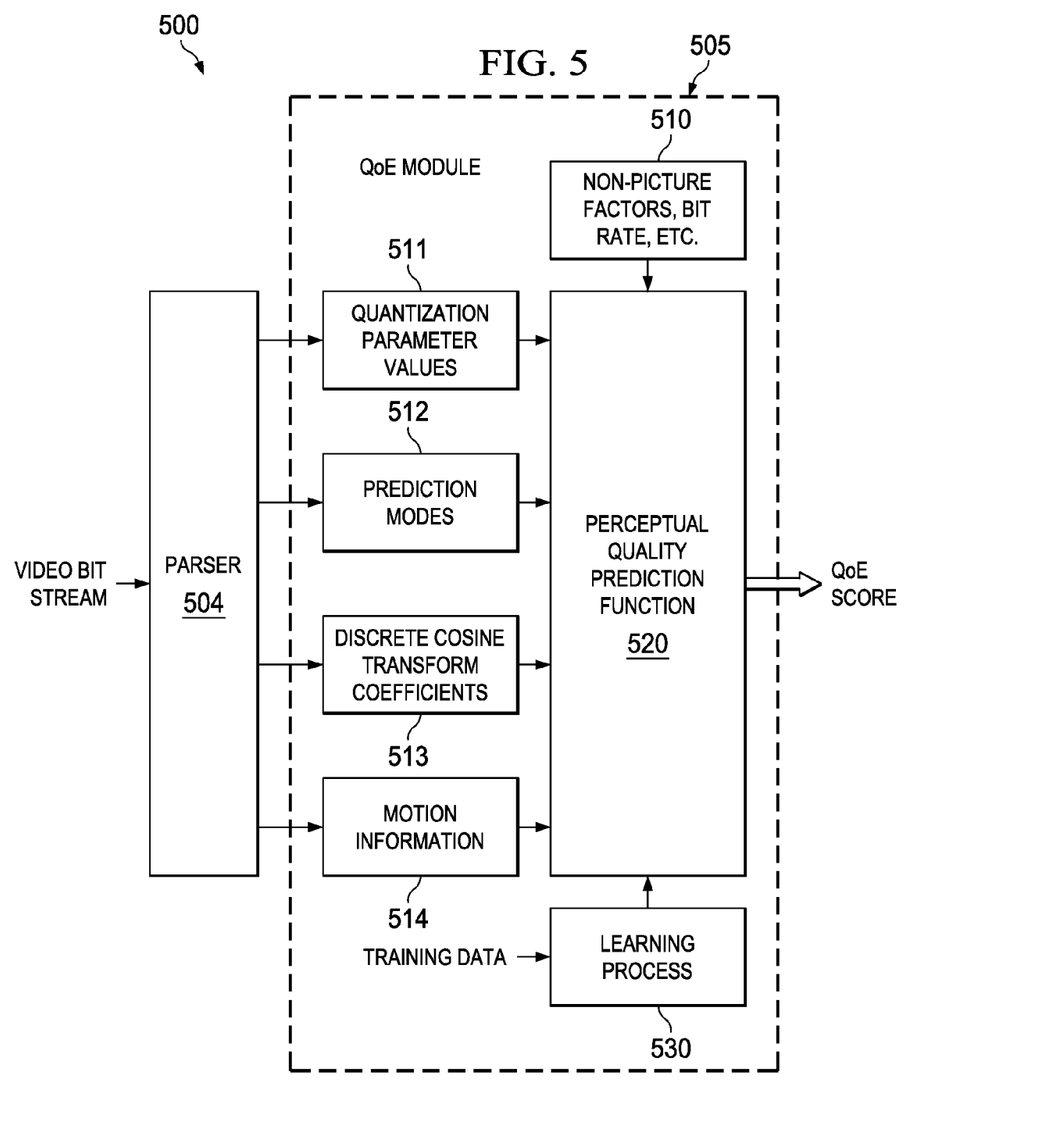
FIG. 5 illustrates a diagram of an embodiment of a QoE architecture for objectively determining QoE based on extracted video coding components.

FIG. 5 illustrates an embodiment of a QoE architecture 500 for objectively determining QoE of a video bit-stream. The QoE architecture 500 may comprise a parser 504 and a QoE module 505, which may be configured similarly to the parser 404 and the QoE module 405 in FIG. 4. The parser 504 may analyze the video bit-stream to decode the video components 511-514, which may include QP values 511, intra-prediction modes 512, DCT coefficients 513, and motion information 514. The video components 511-514 may be used by the perceptual quality prediction function 520 to produce the QoE score. In an embodiment, the perceptual quality prediction function 520 may also consider other factors 510 when producing the QoE score. The other factors 510 may include non-picture factors (e.g., such as frame-rate, packet loss, etc.), instantaneous bit-rate, normalized bit-rate, and other factors.

In some embodiments, the perceptual quality prediction function 520 may include a learning process 530, which may incorporate training data obtained from earlier subjective testing. The training data may be generated through earlier independent testing during which subjective QoE assessments of various classes of video media may be generated based on human response. Although the video media (e.g., film, etc.) used to generate the test data may be different than the video media being transported across the network, similar content classifications under similar network conditions may produce similar QoE scores. For instance, training data generated from test media having a similar content classification (e.g., spatial/temporal complexity, average luma levels, etc.) as the video media in the degraded video bit-stream may produce similar QoE scores under similar network conditions. In some embodiments, video media content classifications may be related to video component values (e.g., QP values, intra-prediction modes, DCT coefficients, etc.).

QoE scores may vary across MBs within a single frame, as well as frames within a given sequence of frames. This variation may be due to various factors, such as the objective quality measures used by current video encoding standards. In one embodiment, feature extraction may be performed on a MB-by-MB basis, with the final QoE score of a frame being based on a weighted average of the features of all MBs in the frame. Similarly, the QoE score of a sequence of frames may be based on a weighted average of the scores of all frames in the sequence.

The below includes a brief discussion of some of the video coding components that may be used to determine a QoE score by the perceptual quality prediction function 520. These below discussions are included to give context to this disclosure, and should not be interpreted as limiting in any way. The QP value 511 may correspond to the quantization strength of the DCT coefficients in the video coding scheme. Hence, if no packet loss is suffered in the transport network (e.g., assuming ideal network conditions), then the QP value may represent the only source of distortion in the reconstructed video media. As a result, the QP value may be extracted from the degraded bit-stream to determine the amount of distortion attributable to lossy compression. In video bit-streams, QP values may vary by frames or blocks, and hence the QoE score may also vary different blocks within a frame or frames within a sequence of frames. As such, a weighted average of QP values may be used to predict QoE scores for a frame or sequence of frames.

As discussed above, MBs may be either predicted spatially (e.g., according to intra-prediction) or temporally (e.g., according to inter-prediction) before being transformed, quantized, and encoded. As such, a MB's prediction mode may provide various information about the MB, such as information relevant to the texture, pattern, average luma level, etc. of the MB. For intra-predicted frames, the MPEG-II standard may only provide DC predictors, and consequently there may be a relatively small amount of prediction mode information that is capable of being extracted from the bit-stream. However, intra-prediction in the H.264/AVC standard is performed using different MB sizes (8×8, 16×16, . . . etc.), as well as different prediction directions. These variations in MB size and prediction direction may correspond to varying levels of texture complexity within an intra-predicted frame, and, as a result, intra-prediction modes may be used, e.g., along with DCT coefficients, to better predict the quality of H.264/AVC intra-predicted frames.

DCT coefficients may be used along with the DC component of quantized DCT coefficients and prediction mode information to accurately estimate the average luma level of a MB. Since the human visual system is more sensitive to some luma levels than others, QoE scores may be more significantly affected when the average luma level is within a certain range. In other words, the same quantization scheme and network conditions may result in different visual quality perceptions at different average luma levels. Therefore, the average luma level of a block may be relevant to the QoE estimation. On the other hand, DCT coefficients together with intra-prediction modes (and motion information for inter-predicted frames) may correspond to the complexity of the current scene, which may also affect the sensitivity of the human visual system. For instance, the video component parameters discussed above may be used in conjunction with the local bit rate for a MB to estimate or otherwise determine the complexity of a MB.

Motion information 514 may relate to the motion vector(s) corresponding to the MBs of an inter-predicted frame. For instance, each MB of a P-frame may have corresponding motion vector (e.g., pointing to a block in a reference frame), which may be formed from a motion vector prediction component and a motion vector difference component. The motion information 514 may be an important factor that affects the human visual system. For example, the human visual system may typically focus on motion of foreground objects, especially when the motion of foreground objects differs largely from background motion, e.g., camera movement. Further, the human visual system may be less sensitive during periods of intense or heavy motion. As such, motion information may be one factor used to estimate QoE scores.

After the feature extraction, all the extracted features may be aggregated to form a feature vector, and fed into a prediction function to convert the features into a final video quality or QoE score. The prediction function may map high-dimensional inputs into a scalar output function value, and may be controlled by a set of parameters. The parameters may be obtained by a learning process, which may use subjective quality assessment data (e.g., obtained during earlier testing) as inputs.

Figure 6:
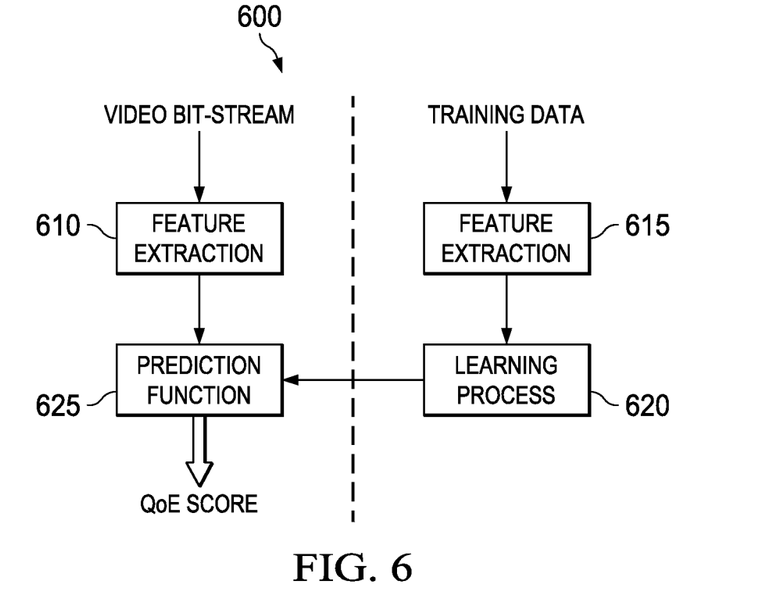
FIG. 6 illustrates a block diagram of an embodiment of a method for QoE prediction that implements learning based on subjective training data.

FIG. 6 illustrates a block diagram of an embodiment of a QoE prediction method 600 that implements a learning process based on subjective training data, as may be implemented by a QoE module (e.g., the QoE module 405/505) in conjunction with a parser (e.g., the parser 404/504). Training data may comprise subjective QoE scores that are correlated with known video component information (e.g., QP values, intra-prediction modes, DCT coefficients, motion information, etc.). Specifically, the subjective scores may be obtained from a subjective data collection process where human subjects are shown test videos, and asked to give a quality ranking (e.g., one to five) to each video. The subjective scores may then be correlated with test video parameter information (e.g., QP values, intra-prediction modes, DCT coefficients, motion information, etc.) to generate the training data. In the QoE prediction method 600, feature extraction functions 610 and 615 may be performed on the video bit-stream and the training data (respectfully). The result of the feature extraction function 615 may be used as an input for the learning process function 620. The results of the learning process function 620 as well as the results of the extracted feature function 610 may be used as inputs to the prediction function 625, which may generate the QoE score. The prediction function can be implemented in different forms, for example, using Neural network or Support Vector Machine (SVM). In some embodiments, the Neural Network may be easier to use and may have similar accuracy to the SVM.

Figure 7:
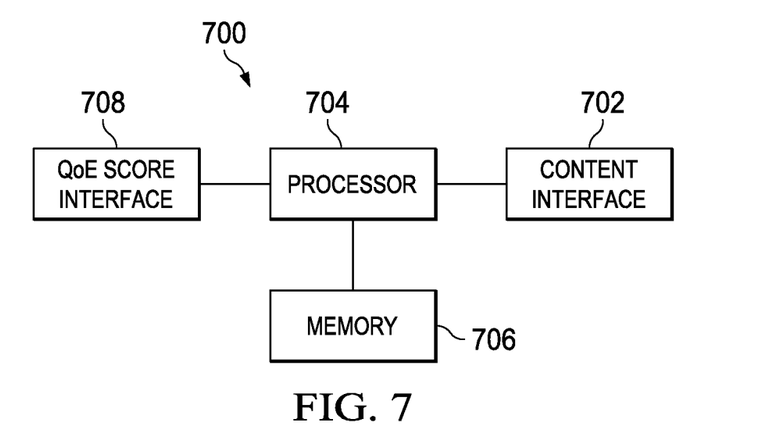
FIG. 7 illustrates a high-level circuit diagram of an embodiment of a QoE module.

FIG. 7 illustrates a high-level circuit diagram of an embodiment of a QoE module 700 for estimating QoE scores based (at least in part) on the content (or content classification) of a video bit-stream (or sequence of frames corresponding thereto). The QoE module 700 may include a content interface 702, a processor 704, a memory 706, and a QoE score interface 708, which may be arranged as shown in FIG. 7. The content interface 702 may be any component or collection of components that allows the QoE module 700 to receive information related to the content and/or quality of the video bit-stream, including compressed domain features (e.g., QP parameters, intra-prediction modes, etc.), QoS metrics (e.g., bit-error rates, etc.), and/or any other information used to compute the QoE score. The processor 704 may be any component capable of performing computations and/or other processing related tasks, and the memory 706 may be any component capable of storing data and/or programming instructions for execution by the processor 704. In an embodiment, the memory 706 may store training data as well as programming instructions for estimating a QoE score. In the same or other embodiments, the processor 704 may compute the QoE score based off information received over the content interface 702, the instructions/data stored in the memory 706, or combinations thereof. The QoE score interface 708 may be any component or collection of components that allows the QoE module 700 to communicate the QoE score to a service provider or network administrator. In some embodiments, the QoE score interface 708 may allow the QoE module 700 to communicate the QoE score to a user equipment or viewing device. In some embodiments, the QoE module 700 may be located on-board (or otherwise attached to) a piece of end user communication equipment, e.g., a set-top box, a digital video recorder, a modem, etc.

Although the present invention and its advantages have been described in detail, it should be understood that various changes, substitutions and alterations can be made herein without departing from the spirit and scope of the invention as defined by the appended claims. For example, the order of downloaded patches may be adjusted as desired in order to maximize the potential for recovery or to address any security concerns. Additionally, the precise methods by which components may be verified or loads be validated may also vary from the specific embodiments described here while remaining within the scope of the embodiments.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A method for objectively determining perceived video/image quality, the method comprising:
    receiving, by a device, a bit-stream comprising encoded video/image data corresponding to an original frame or an original sequence of frames;
    parsing the bit-stream to extract a set of video/image coding components, wherein the extracted set of video/image coding components comprise at least one of a set of intra-prediction modes, a set of discrete cosine transform (DCT) coefficients, and motion information; and
    performing a prediction function in accordance with the extracted set of video/image coding components prior to decoding the bit-stream to estimate a quality of experience (QoE) score for the encoded video/image data.

2. The method of claim 1, wherein the extracted set of video/image coding components comprise the motion information, and
    wherein performing the prediction function to estimate the QoE score comprises estimating a temporal complexity of the sequence of frames in accordance with the motion information.

3. The method of claim 1, wherein the extracted set of video/image coding components comprise the set of intra-prediction modes and the set of DCT coefficients, and
    wherein performing the prediction function to estimate the QoE score comprises estimating a spatial complexity of an intra-coded frame based at least in part on the set of intra-prediction modes and the set of DCT coefficients.

4. The method of claim 1, wherein the sequence of frames comprises an intra-coded frame comprising a plurality of macroblocks or blocks,
    wherein the extracted set of video/image coding components include a first set of DCT coefficients corresponding to a first one of the macroblocks or blocks, and
    wherein performing the prediction function comprises estimating an average luma value for the first macroblock in accordance with the first set of DCT coefficients.

5. The method of claim 1, wherein the sequence of frames comprises an intra-coded frame comprising a plurality of macroblocks or blocks,
    wherein the extracted set of video/image coding components further comprise a plurality of quantization parameter values each of which corresponding to a different one of the macroblocks or blocks, and
    wherein performing the prediction function comprises determining an average quantization parameter value across all macroblocks or blocks.

6. The method of claim 1, wherein the encoded video/image data corresponds to the original
    sequence of frames comprising a plurality of individual frames, and
    wherein the performing the prediction function comprises:
        estimating an individual QoE score for each frame; and
        computing a weighted average of all of the individual QoE scores.

7. The method of claim 1, wherein the QoE score is estimated without reference to the original frame or the original sequence of frames.

8. The method of claim 1, wherein the extracted set of video/image coding components comprise each of the set of intra-prediction modes, the set of DCT coefficients, and the motion information.

9. A method for objectively determining perceived video/image quality, the method comprising:
- receiving a bit-stream comprising encoded video/image data corresponding to an original frame or an original sequence of frames;
- parsing the bit-stream to extract a set of video/image coding components, wherein the extracted set of video/image coding components comprise at least one of a set of intra-prediction modes, a set of discrete cosine transform (DCT) coefficients, and a motion information;
- determining a content classification corresponding to the original frame or the original sequence of frames in accordance with the extracted set of video/image coding components; and
- performing a prediction function to estimate a quality of experience (QoE) score for the encoded video/image data prior to decoding the bit-stream, wherein performing the prediction function comprises estimating the QoE score for the encoded video/image data based at least in part on a known QoE score associated with training data, and wherein the training data has a similar content classification to that of the original frame or the original sequence of frames.

10. The method of claim 9, wherein the training data comprises a collection of subjective image quality assessments in accordance with human responses to subjective testing.

11. The method of claim 9, wherein the QoE score is generated without reference to the original frame or the original sequence of frames.

12. A non-transitory computer program product comprising computer executable instructions stored on a non-transitory computer readable medium, the computer executable instructions including instructions to:
- receive a degraded bit-stream comprising a plurality of video/image coding components corresponding to a plurality of macroblocks or blocks of an original frame or an original sequence of frames;
- parse the degraded bit-stream to extract a set of the video/image coding components;
- estimate an average luma value for at least one of the macroblocks or blocks in accordance with the extracted set of video/image coding components; and
- estimate a quality of experience (QoE) score corresponding to the degraded video/image bit-stream based at least in part on the average luma value prior to decoding of the degraded bit-stream.

13. The non-transitory computer program product of claim 12, wherein the extracted set of video/image coding components comprise a set of discrete cosine transform (DCT) coefficients corresponding to the at least one of the macroblocks or blocks.

14. The non-transitory computer program product of claim 12, wherein the extracted set of video/image coding components comprise a set of intra-prediction modes corresponding to the at least one macroblock.

15. The non-transitory computer program product of claim 12, wherein the QoE score is generated without reference to the original frame or the original sequence of frames.

16. A non-transitory computer program product comprising computer executable instructions stored on a non-transitory computer readable medium, the computer executable instructions including instructions to:
- receive a degraded bit-stream comprising a plurality of video/image coding components corresponding to an original frame or an original sequence of frames;
- parse the degraded bit-stream to extract a set of the video/image coding components;
- estimate a complexity of the original frame or the original sequence of frames in accordance with the extracted set of video/image coding components; and
- estimate a quality of experience (QoE) score corresponding to the degraded video/image bit-stream based at least in part on the complexity of the original frame or the original sequence of frames, the QoE score being estimated prior to decoding of the degraded bit-stream.

17. The non-transitory computer program product of claim 16, wherein the extracted set of video/image coding components comprise a set of discrete cosine transform (DCT) coefficients corresponding to the original frame or the original sequence of frames.

18. The non-transitory computer program product of claim 17, wherein the extracted set of video/image coding components comprise motion information corresponding to the original frame or the original sequence of frames.

19. The non-transitory computer program product of claim 17, wherein the QoE score is generated without reference to the original frame or the original sequence of frames.

* * * * *